United States Patent
Yamada

(10) Patent No.: US 8,270,016 B2
(45) Date of Patent: Sep. 18, 2012

(54) PRINTING DEVICE, METHOD AND COMPUTER READABLE MEDIUM FOR PRINT PROCESS

(75) Inventor: Akihiro Yamada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 868 days.

(21) Appl. No.: 12/277,410

(22) Filed: Nov. 25, 2008

(65) Prior Publication Data

US 2009/0135447 A1   May 28, 2009

(30) Foreign Application Priority Data

Nov. 28, 2007  (JP) .................................. 2007-307547

(51) Int. Cl.
*G06F 15/00* (2006.01)
*G06F 3/00* (2006.01)
(52) U.S. Cl. ........................................ 358/1.15; 710/15
(58) Field of Classification Search .................. 358/1.15, 358/1.13
See application file for complete search history.

(56) References Cited

U.S. PATENT DOCUMENTS

| | | | |
|---|---|---|---|
| 5,594,653 A | 1/1997 | Akayama et al. | |
| 5,987,224 A | 11/1999 | Koakutsu et al. | |
| 6,360,135 B1 | 3/2002 | Miyasaka et al. | |
| 7,271,924 B1 | 9/2007 | Takamizawa et al. | |
| 2001/0024585 A1 | 9/2001 | Koakutsu et al. | |
| 2005/0231759 A1 | 10/2005 | Kamijima | |
| 2006/0055972 A1 | 3/2006 | Saikawa | |
| 2006/0195596 A1 | 8/2006 | Kawai | |
| 2007/0086036 A1 | 4/2007 | Tanaka | |
| 2007/0266057 A1* | 11/2007 | Utsumi | 707/203 |
| 2007/0296999 A1 | 12/2007 | Takamizawa et al. | |

FOREIGN PATENT DOCUMENTS

| | | |
|---|---|---|
| JP | 9048165 A | 2/1997 |
| JP | 10-024635 | 1/1998 |
| JP | 2001-180052 | 7/2001 |
| JP | 2002-264455 | 9/2002 |
| JP | 2002-297349 | 10/2002 |
| JP | 2003-330659 | 11/2003 |
| JP | 2004005758 A | 1/2004 |
| JP | 2004-268535 | 9/2004 |
| JP | 2005-202669 | 7/2005 |

(Continued)

OTHER PUBLICATIONS

Notification of Reasons for Rejection for Japanese patent application No. 2010-034334 mailed May 10, 2011.

(Continued)

*Primary Examiner* — Saeid Ebrahimi Dehkordy
(74) *Attorney, Agent, or Firm* — Banner & Witcoff, Ltd.

(57) ABSTRACT

There is provided a printing device comprising: a data receiving unit configured to receive data transmitted from an external computer via a network; a print unit configured to execute a print process based on the data received by the data receiving unit; a prohibition unit configured to accept a command for prohibiting execution of the print process; an analysis unit configured to analyze the data received by the data receiving unit; and an execution control unit configured such that if a command other than a print command is contained in the data received by the data receiving unit, the execution control unit executes the command other than the print command even in a state where execution of the print process is prohibited through the prohibition unit.

19 Claims, 4 Drawing Sheets

FOREIGN PATENT DOCUMENTS

| | | |
|---|---|---|
| JP | 2005-288879 | 10/2005 |
| JP | 2006-062266 | 3/2006 |
| JP | 2006-110863 | 4/2006 |
| JP | 2006-236141 | 9/2006 |
| JP | 2006-305938 | 11/2006 |
| JP | 2007110518 A | 4/2007 |
| JP | 2007-122520 | 5/2007 |
| JP | 2007300545 A | 11/2007 |

OTHER PUBLICATIONS

Notification of Reasons for Rejection for related Japanese Patent Application 2010-034334 mailed Sep. 6, 2011.

Notification of Reasons of Rejection for Japanese Application No. 2007-307547 mailed on Dec. 22, 2009.

* cited by examiner

PRINTING DEVICE, METHOD AND COMPUTER READABLE MEDIUM FOR PRINT PROCESS

CROSS-REFERENCE TO RELATED APPLICATION

This application claims priority under 35 U.S.C. §119 from Japanese Patent Application No. 2007-307547, filed on Nov. 28, 2007. The entire subject matter of the application is incorporated herein by reference.

BACKGROUND

1. Technical Field

Aspects of the present invention relate to a printing device which executes a print process based on data transmitted from a computer.

2. Related Art

Printing devices having a function of judging whether to permit execution of a print process for data received from a computer (client) in accordance with user information contained in the received data have been widely used. An example of such a printing device is disclosed in Japanese Patent Provisional Publication No. 2005-288879A (hereafter, referred to as JP2005-288879A).

SUMMARY

Incidentally, the printing device receives not only print data for which the printing device executes the print process at the time of receiving the print data from the computer, but also data other than the print data from the computer. The data other than the print data includes secure print data to which a command for instructing the printing device to execute the print process in accordance with authentication information is added, image data to which a command for instructing the printing device to store overlaying data (e.g., a watermark) to be overlaid on a print target image is added, a command for instructing the printing device to change settings of various parameters of the printing device, and a command for instructing the printing device to respond to an inquiry about information stored in the printing device.

However, the printing device disclosed in JP2005-288879A has a drawback that if execution of the print process based on data from the computer is prohibited, the printing device operates not to receive the data from the computer or the printing device operates to discard the received data from the computer when the printing device receives data other than the print data (i.e., data not requiring execution of the print process) from the computer. That is, in the state where execution of the printing operation based on data from the computer is prohibited, the printing device is not able to execute the various types of commands contained in the data not requiring execution of the printing operation.

Aspects of the present invention are advantageous in that a printing device having a high degree of usability regarding handling of data from a computer is provided.

According to an aspect of the invention, there is provided a printing device comprising: a data receiving unit configured to receive data transmitted from an external computer via a network; a print unit configured to execute a print process based on the data received by the data receiving unit; a prohibition unit configured to accept a command for prohibiting execution of the print process; an analysis unit configured to analyze the data received by the data receiving unit; and an execution control unit configured such that if a command other than a print command is contained in the data received by the data receiving unit, the execution control unit executes the command other than the print command even in a state where execution of the print process is prohibited through the prohibition unit.

Since the command other than the print command can be executed even in a state where execution of the print command is prohibited, it is possible to enhance usability of the printing device.

According to another aspect of the invention, there is provided a method to be implemented on a printing device for processing data transmitted from an external computer via a network. The method comprises the steps of: receiving data transmitted from the external computer; accepting a command for prohibiting execution of a print process; analyzing the received data; and executing a command other than a print command even in a state where execution of the print process is prohibited, if the command other than the print command is contained in the received data.

Since the command other than the print command can be executed even in a state where execution of the print command is prohibited, it is possible to enhance usability of the printing device.

According to another aspect of the invention, there is provided a computer readable medium having computer readable instruction stored thereon, which, when executed by a processor of a printing device for processing data transmitted from an external computer via a network, configures the processor to perform the steps of: receiving data transmitted from the external computer; accepting a command for prohibiting execution of a print process; analyzing the received data; and executing a command other than a print command even in a state where execution of the print process is prohibited, if the command other than the print command is contained in the received data.

Since the command other than the print command can be executed even in a state where execution of the print command is prohibited, it is possible to enhance usability of the printing device.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, an embodiment according to the invention will be described with reference to the accompanying drawings.

Figure 1:
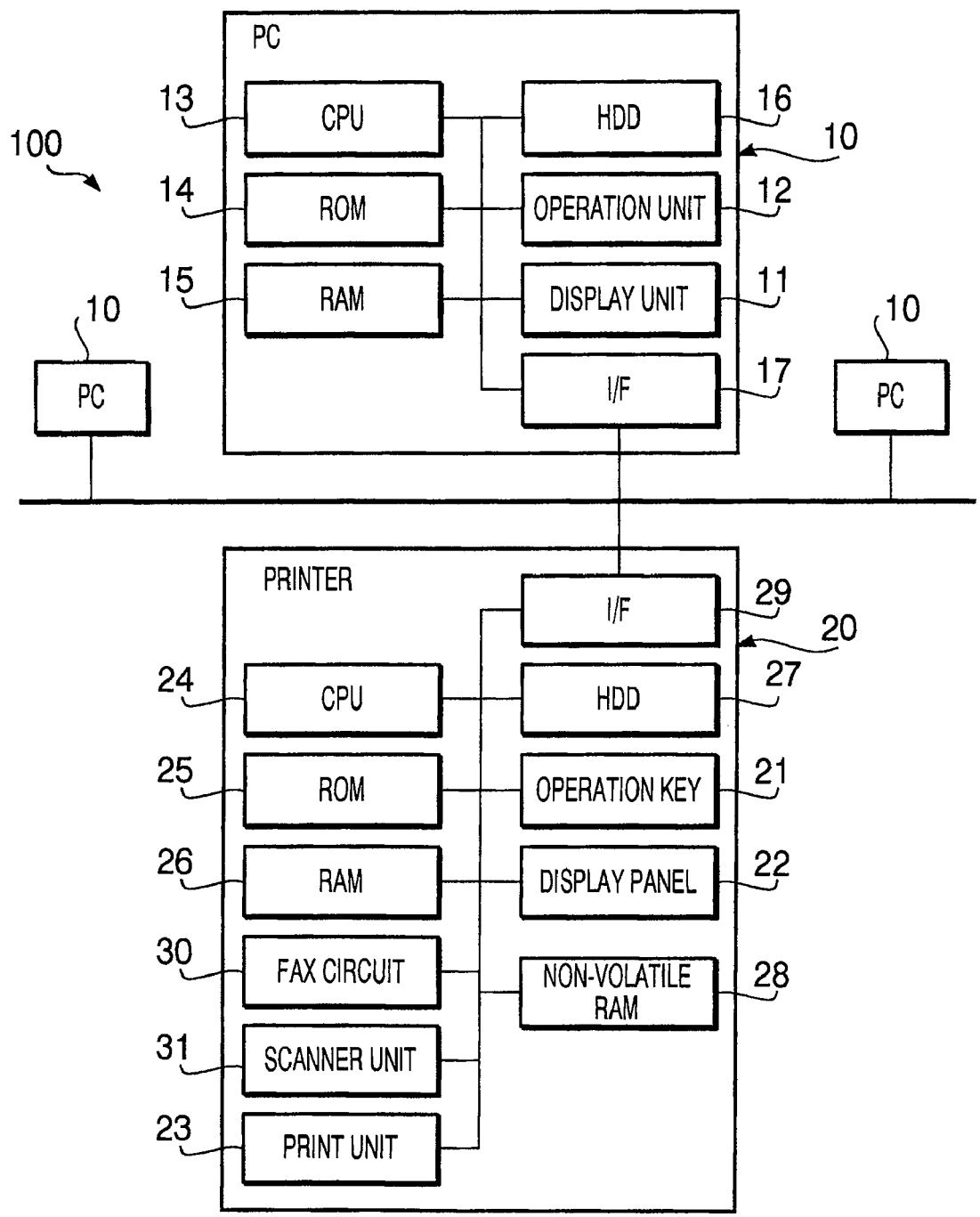
FIG. 1 illustrates a system configuration of a print system in which a PC and a printer according to an embodiment are provided.

FIG. 1 illustrates a system configuration of a print system 100 in which a PC (personal computers) 10 and a printer 20 according to an embodiment are provided. As shown in FIG. 10, more than one PC 10s may be provided in the print system 100. In FIG. 1, block diagrams of the PC 10 and the printer 20 are also illustrated. The PC 10 includes a display unit 11, an operation unit 12, a CPU 13, a ROM 14, a RAM 15, an HDD 16, and a network interface 17 (which is abbreviated as "I/F" in FIG. 1). The network interface 17 interfaces the PC 10 with a network (e.g., a LAN).

The display unit 11 is, for example, an LCD or a CRT. The operation unit 12 includes a pointing device (e.g., a mouse) and a keyboard. On the PC 10, an OS (operating system), such as Windows®, has been installed.

As shown in FIG. 1, the printer 20 includes an operation key 21, a display panel 22, a print unit 23, a CPU 24, a ROM 25, a RAM 26, and an HDD 27. The operation key 21 is used to conduct a user operation, such as selecting one of various functions of the printer 20 or inputting various parameters to the printer 20. On the display panel 22, various types of information, such as operation statuses or conditions of the printer 20 are displayed. The print unit 23 has the function of printing an image on a recording medium, such as a sheet of paper.

The printer 20 further includes a non-volatile RAM 28, a network interface 29 (which is abbreviated as "I/F" in FIG. 1), a facsimile circuit 30, and a scanner unit 31.

The display panel 22 has a touch panel function of detecting whether a user touches the display panel 22 and detecting the position at which the user touches the display panel 22. The printer 20 is able to receive various user commands from the user through the touch panel function.

The non-volatile RAM 28 is able to maintain data during a power off state of the printer 20. The network interface 29 interfaces the printer 20 with the network. Therefore, the printer 10 is connected to the PCs 10 via the network interface 29.

The facsimile circuit (FAX circuit) 30 has the function of transmitting and receiving facsimile data. Facsimile data received by the facsimile circuit 30 is printed by the print unit 23. The scanner unit 31 has the function of optically reading an image from a document. The printer 20 has a copying function of printing an image corresponding to image data read by the scanner unit 31, a facsimile function of converting image data read by the scanner unit 31 into facsimile data and transmitting the facsimile data through the facsimile circuit 30, and a function storing or outputting image data read by the scanner unit 31 as data having a predetermined format.

The CPU 24, the ROM 25, and the RAM 26 constitutes a control unit for controlling various components including the print unit 23 and the display panel 22 in the printer 20.

Operations of the print system 100 are controlled by a printer driver which is installed on the PC 10 and runs on the PC 10 and a control program which is installed on the printer 20 and runs on the printer 10.

Figure 3:
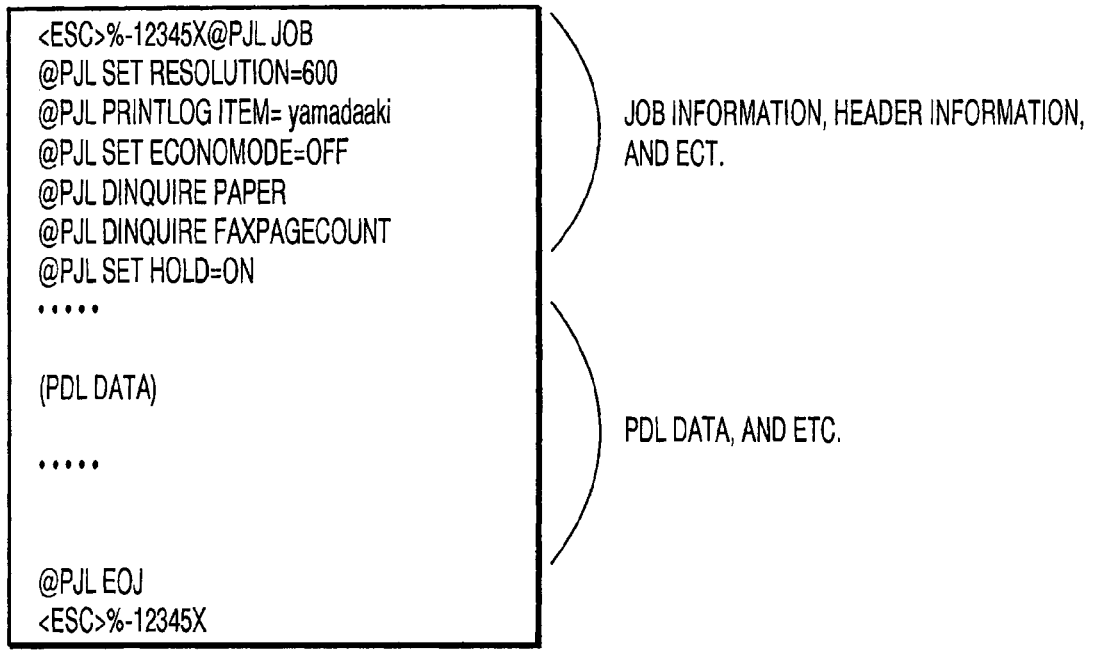
FIG. 3 illustrates an example of a data structure of data received from the PC.

When a print command is inputted to the PC 10 through the display unit 11 or the operation unit 12, typically the printer driver converts print target data into print data (i.e., data having a print format), such as PDL (Page Description Language) data in cooperation with the OS, creates transmission data formed by adding header information to the PDL data, and thereafter transmits the transmission data to the printer 20 via the network interface 17. In this case, the header information includes user information representing a user who has inputted the print command, and print setting information, such as a paper size or a print scheme (see FIG. 3).

Through the network interface 29, the printer 20 receives the transmission data transmitted from the PC 10. Then, the printer 10 controls the print unit 23 to print an image based on the received data on a sheet of paper. Hereafter, the function of printing an image on a sheet of paper based on data received from the PC 10 is referred to as a PC print function.

On the PC 10 in the print system 100, the user is allowed to input commands other than a print command (hereafter, referred to as a non-print command) through a tool (a utility program), such as a printer driver, running on the PC 10.

The non-print commands include a setting change command for changing settings regarding the functions of the printer 20 including the copying function, the facsimile function and the PC print function, an inquiry command for inquiring about the settings of the functions of the printer 20, a command for instructing the printer 20 to store overlaying data (e.g., a watermark) to be overlaid on a print target image, and secure print data to which a command for instructing the printer 20 to execute the print process based on authentication information is added. The settings of the printer 20 include a print paper size, print settings, the number of printed sheets of paper, the remaining amount of material for recording (e.g., toner or ink), and the settings of use conditions concerning maintenance of the printer 20.

The setting change command is used, for example, to instruct the printer 20 to change the resolution of the printer 20 and to reset the count of a page counter which counts the number of printed sheets of paper.

The inquiry command is used to instruct the printer 20 to transmit the setting information, such as resolution of the printer 20 and the count of the page counter, to the PC 10. That is, by transmitting the inquiry command to the printer 20, the PC 10 is able to obtain the setting information of the printer 20.

The printer 20 accepts, for each of the PCs 10 (users), the setting regarding whether to prohibit execution of the print process based on the print command from the computer 10 and the setting regarding whether to permit execution of a non-print command.

Figure 4:
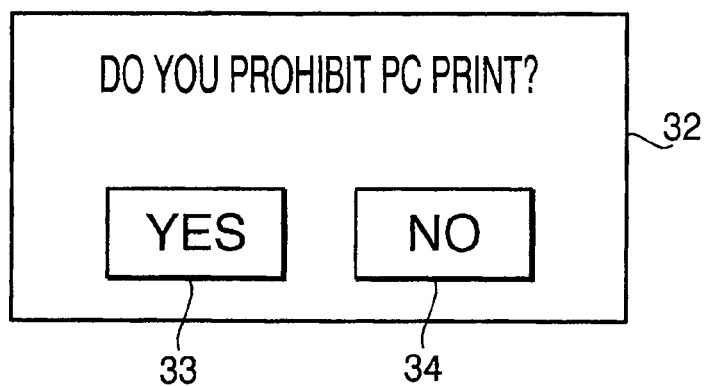
FIG. 4 illustrates a dialog for prohibiting a print process on the printer.

In order to prohibit execution of the print process, the user operates the operation key 21 to display a dialog 32 shown in FIG. 4, and thereafter presses a "YES" button 33 on the dialog 32. If the user presses a "NO" button 34 on the dialog 32, the prohibited state of the print process is released.

Figure 5:
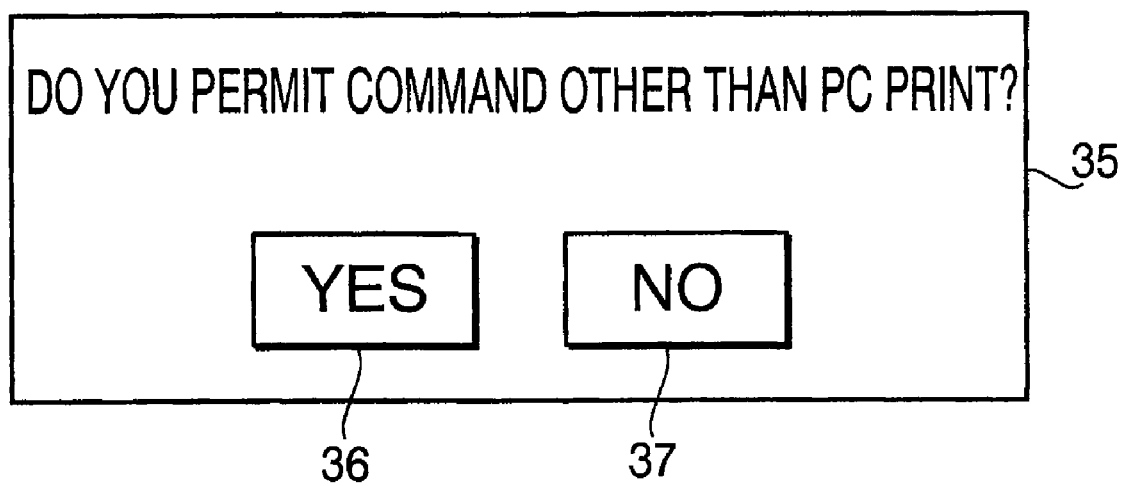
FIG. 5 illustrates a dialog for setting whether to permit execution of a non-print command.

In order to permit execution of a non-print command, the user operates the operation key 21 to display a dialog 35 shown in FIG. 5, and thereafter presses a "YES" button 36. If a "NO" button 37 is pressed on the dialog 35, a non-print command is not executed.

The printer 20 may be configured such that the setting regarding whether to prohibit execution of the print process based on the print command from the computer 10 and the setting regarding whether to permit execution of a non-print command are accepted only for an administrator of the printer 20.

In this case, as a condition to be met to allow presentation of the dialog 32 or 35, the printer 20 requests the user to input a password of the administrator through the operation key 21 or the display panel 22. That is, if the inputted password is a proper password, the printer 20 executes a process for requesting the user to select a target PC 10 to which the setting inputted through the dialog 32 or 35 should be applied. In response to completion of selection of the target PC 10, the dialog 32 or 35 is displayed on the display panel 22.

Figure 2:
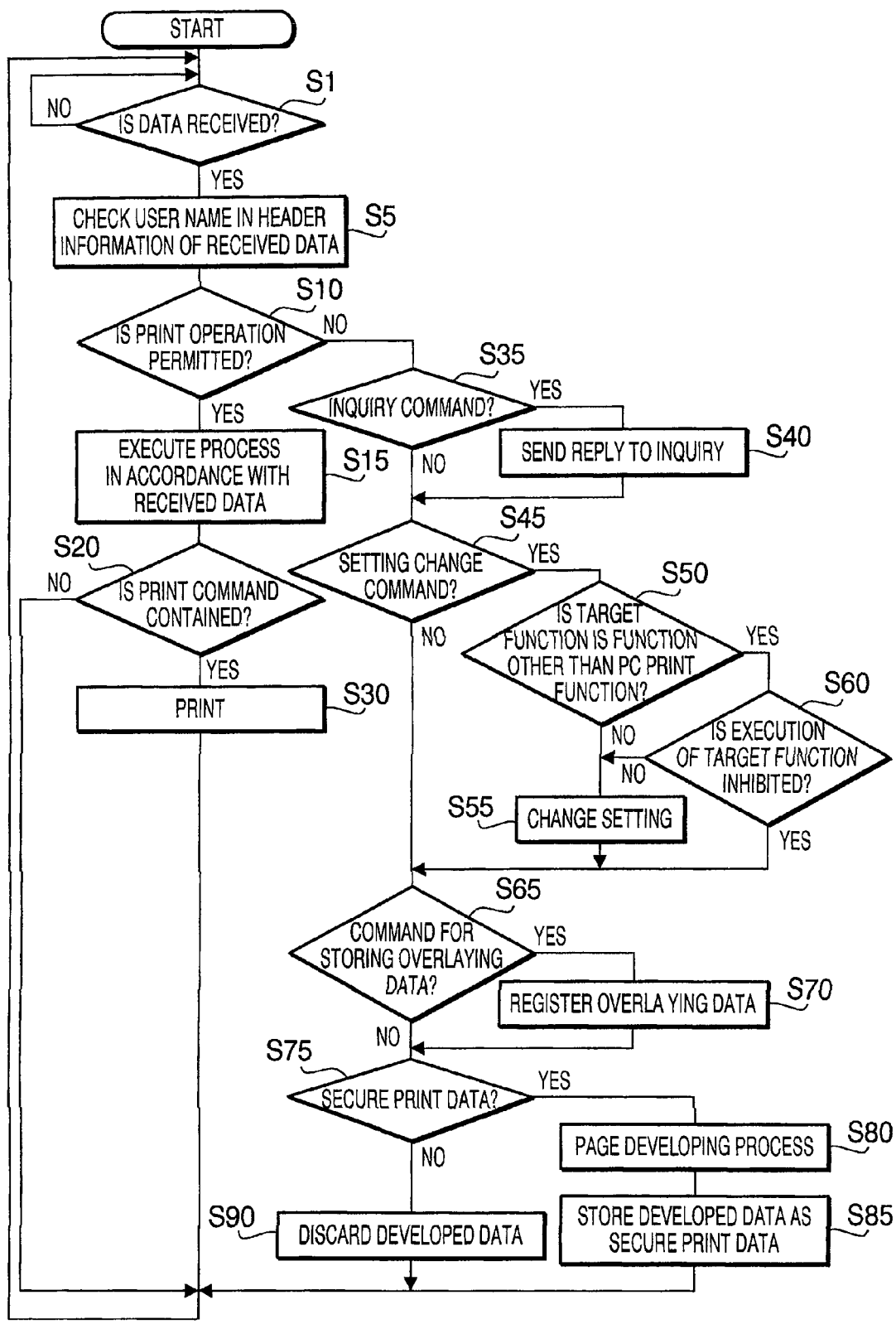
FIG. 2 is a flowchart illustrating a control process executed under control of a CPU of the printer.

Hereafter, a control process executed by the printer 20 is described. FIG. 2 is a flowchart illustrating the control process executed under control of the CPU 24 of the printer 20.

As described in detail below, when the network interface 29 receives data (hereafter, frequently referred to as received data) from the computer 10, the CPU 24 analyzes the received data. If a non-print command is contained in the received data and execution of a non-print command is permitted, the printer 20 executes the non-print command even if execution of the print process is prohibited.

The control process shown in FIG. 2 is started when the printer 20 is turned ON. When the printer 20 is turned OFF, the control process is terminated. First, the CPU 24 judges whether data is received from the PC 10 (step S1). The CPU 24 waits until data is received from the PC 10 (S1: NO).

When data is received from the PC 10 (S1: YES), the CPU 24 analyses header information of the received data and checks a sender (user name) of the received data based on the header information (step S5). Then, the CPU 24 judges whether execution of the print process is permitted for the user of the received data (step S10).

If execution of the print process is not permitted for the user of the received data (S10: NO), control proceeds to step S35 where the CPU 24 judges whether the inquiry command for inquiring about settings concerning the functions of the printer 20 including the copying function, the facsimile function and the PC print function is contained in the received data. If the inquiry command is not contained in the received data (S35: NO), the CPU 24 judges whether the setting change command for changing the settings concerning the functions of the printer 20 including the copying function, the facsimile function and the PC print function is contained in the received data (step S45).

If the CPU 24 judges that the inquiry command is contained in the received data (S35: YES), the CPU 24 obtains setting information corresponding to the inquiry, and then transmits the obtained setting information to the PC 10 via the network interface 29 (step S40). Then, control proceeds to step S45.

If the setting change command is contained in the received data (S45: YES), the CPU 24 judges whether a target function of the setting change command is a function (e.g., the copying function or the facsimile function) other than the PC print function (step S50). If the CPU 24 judges that the target function of the setting change command is the PC print function (S50: NO), the CPU 24 changes the setting of the PC print function stored in the non-volatile RAM 28 in accordance with the setting change command (step S55).

On the other hand, if the CPU 24 judges that the target function is a function other than the PC print function (S50: YES), the CPU 24 judges whether execution of the target function is prohibited (step S60).

If execution of the target function is not prohibited (S60: NO), the CPU 24 change the setting of the target function stored in the non-volatile RAM 28 in accordance with the setting change command (step S55). Then, control proceeds to step S60 where the CPU 24 judges whether the command for storing overlaying data (e.g., a watermark image) is contained in the received data (step S65).

If execution of the target function is prohibited (S60: YES), the CPU 24 does not change the setting of the target function. In this case, control proceeds to step S65.

If the CPU 24 judges that the command for storing overlaying data is not contained in the received data (S65: NO), control proceeds to step S75 where the CPU 24 judges whether PDL data contained in the received data is secure print data to which a command for executing the print process in accordance with authentication information is added.

On the other hand, if the CPU 24 judges that the command for storing overlaying data is contained in the received data (S65: YES), the CPU 24 stores the overlaying data in the non-volatile RAM 28 or the HDD 27 (step S70). Then, control proceeds to step S75.

If the CPU 24 judges that the PDL data is the secure print data (S75: YES), the CPU 24 executes a page developing process (a rasterization process) for developing the PDL data for the print process (step S80). Then, the CPU 24 stores the developed data in the non-volatile RAM 28 or the HDD 27 as secure print data (step S85). Then, control returns to step S1.

It should be noted that data stored as secure print data in the non-volatile RAM 28 or the HDD 27 is printed when the user inputs authentication information to the printer 20 through the operation key 21 or the display panel 22 and the printer judges that the inputted authentication information matches authorized authentication information which has been stored in the printer 20 and that execution of the print process is permitted.

On the other hand, if the CPU 24 judges that the PDL data is not the secure print data (S75: NO), the CPU 24 discards the developed data if the developed data developed from the PDL data exists (step S90). Then, control returns to step S1.

It should be noted that although start of execution of the page developing process is not explicitly instructed in the control process shown FIG. 2, actually the CPU24 analyzes the received data sequentially from the first line of the received data and starts the page developing process when the CPU 24 starts the analysis of the PDL data in the received data. Therefore, the judgment result as to whether the developed data exits or not may change depending on the timing of such a judgment in the control process.

If execution of the print process is permitted for the user of the received data (S10: YES), the CPU 24 analyzes the received data. If the received data contains a non-print command, the same steps as the steps S35-S85 are executed to process the non-print command (step S15).

Then, the CPU 24 judges whether a print command is contained in the received data (step S20). If the print command is not contained in the received data (S20: NO), control returns to step S1. If the print command is contained in the received data (S20: YES), the print process is executed for the received data (step S30). Then, control returns to step S1.

As described above according to the embodiment, if a non-print command is contained in the received data, the non-print command is processed even if the print process is prohibited. Therefore, usability of the printer 20 can be enhanced.

Although the present invention has been described in considerable detail with reference to certain preferred embodiments thereof, other embodiments are possible.

In the above described embodiment, the printer 20 and the PC 10 are connected via the network. However, the printer 20 may be directly connected to the PC 10.

It should be noted that the non-print command is not limited to the examples described in the embodiment. The data structure of the received data is not limited to the example shown in FIG. 3, but the received data may have various types of data structures.

What is claimed is:

1. A printing device, comprising:
   a data receiving unit configured to receive at the printing device data transmitted from an external computer via a network;
   a print unit in the printing device configured to execute a print process based on the data received by the data receiving unit;

a memory in the printing device; and a processor in the printing device configured to execute instructions stored in the memory that cause the printing device to function as units including:

a prohibition unit configured to accept a command for prohibiting execution of the print process;

an analysis unit configured to analyze the data received by the data receiving unit; and an execution control unit configured such that if a command other than a print command is contained in the data received by the data receiving unit, the execution control unit executes the command other than the print command even in a state where execution of the print process is prohibited through the prohibition unit.

2. The printing device according to claim 1, wherein if the command other than the print command includes a setting change command, the execution control unit change settings of the printing device in accordance with the setting change command.

3. The printing device according to claim 1, wherein if the command other than the print command includes an inquiry command for inquiring about settings of the printing device, the execution control unit transmits a reply to the inquiry command to the external computer.

4. The printing device according to claim 1, further comprising a storage unit, wherein if the command other than the print command includes a command for instructing the printing device to store overlaying data to be overlaid on a print target image, the execution control unit stores the overlaying data in the storage unit in accordance with the command for instructing the printing device to store overlaying data.

5. The printing device according to claim 1, further comprising a storage unit, wherein if the command other than the print command includes a command for executing the print process based on authentication information, the execution control unit stores image data targeted for the print process to be executed based on the authentication information in the storage unit.

6. The printing device according to claim 1, further comprising a discarding unit configured such that if execution of the print process is prohibited and the analysis unit judges that the data received by the data receiving unit contains image data defined as a print target, the discarding unit discards data generated by developing the image data for the print process.

7. The printing device according to claim 1, further comprising a command input unit configured to input a command for activating the execution control unit.

8. A method to be implemented on a printing device for processing data transmitted from an external computer via a network, comprising the steps of:

receiving in a printing device data transmitted from the external computer;

accepting in the printing device a command for prohibiting execution of a print process;

analyzing the received data in the printing device; and executing in the printing device a command other than a print command even in a state where execution of the print process is prohibited, if the command other than the print command is contained in the received data.

9. The method according to claim 8, wherein the step of executing comprises the step of changing settings of the printing device in accordance with a setting change command if the command other than the print command includes the setting change command.

10. The method according to claim 8, wherein the step of executing comprises the step of transmitting a reply to an inquiry command to the external computer if the command other than the print command includes the inquiry command for inquiring about settings of the printing device.

11. The method according to claim 8, wherein the step of executing comprises the step of storing overlaying data in a storage unit of the printing device in accordance with the command other than the print command if the command other than the print command includes a command for instructing the printing device to store overlaying data to be overlaid on a print target image.

12. The method according to claim 8, wherein the step of executing comprises the step of storing image data targeted for the print process based on authentication information in a storage unit if the command other than the print command includes a command for executing the print process based on the authentication information.

13. The method according to claim 8, further comprising the step of discarding data generated by developing image data for the print process if execution of the print process is prohibited and it is judged in the step of analyzing that the received data contains the image data defined as a print target.

14. A non-transitory computer readable medium having computer readable instruction stored thereon, which, when executed by a processor of a printing device for processing data transmitted from an external computer via a network, configures the processor to perform the steps of:

receiving in a printing device data transmitted from the external computer;

accepting in the printing device a command for prohibiting execution of a print process;

analyzing the received data in the printing device; and executing in the printing device a command other than a print command even in a state where execution of the print process is prohibited, if the command other than the print command is contained in the received data.

15. The non-transitory computer readable medium according to claim 14, wherein the step of executing comprises the step of changing settings of the printing device in accordance with a setting change command if the command other than the print command includes the setting change command.

16. The non-transitory computer readable medium according to claim 14, wherein the step of executing comprises the step of transmitting a reply to a inquiry command to the external computer if the command other than the print command includes the inquiry command for inquiring about settings of the printing device.

17. The non-transitory computer readable medium according to claim 14, wherein the step of executing comprises the step of storing overlaying data in a storage unit of the printing device in accordance with the command other than the print command if the command other than the print command includes a command for instructing the printing device to store overlaying data to be overlaid on a print target image.

18. The non-transitory computer readable medium according to claim 14,
wherein the step of executing comprises the step of storing image data targeted for the print process based on authentication information in a storage unit if the command other than the print command includes a command for executing the print process based on the authentication information.

19. The non-transitory computer readable medium according to claim 14, wherein the instruction further causes the processor to perform the step of discarding data generated by developing image data for the print process if execution of the print process is prohibited and it is judged in the step of analyzing that the received data contains the image data defined as a print target.

* * * * *